US008891505B2

(12) United States Patent
Murakami et al.

(10) Patent No.: US 8,891,505 B2
(45) Date of Patent: Nov. 18, 2014

(54) WIRELESS COMMUNICATION SYSTEM AND COMMUNICATION METHOD FOR WIRELESS COMMUNICATION SYSTEM

(75) Inventors: Hiroko Murakami, Toyota (JP); Hiroki Okada, Toyota (JP); Arinobu Kimura, Toyota (JP); Kazuhiro Nakashima, Anjo (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 101 days.

(21) Appl. No.: 13/582,597

(22) PCT Filed: Mar. 1, 2011

(86) PCT No.: PCT/IB2011/000424
§ 371 (c)(1),
(2), (4) Date: Nov. 26, 2012

(87) PCT Pub. No.: WO2011/107853
PCT Pub. Date: Sep. 9, 2011

(65) Prior Publication Data
US 2013/0089066 A1    Apr. 11, 2013

(30) Foreign Application Priority Data
Mar. 3, 2010    (JP) ................... 2010-046238

(51) Int. Cl.
*H04J 1/00*  (2006.01)
*G07C 9/00*  (2006.01)
*H04B 1/7143*  (2011.01)
*H04B 1/713*  (2011.01)
*H04B 1/7136*  (2011.01)

(52) U.S. Cl.
CPC .......... *G07C 9/00309* (2013.01); *H04B 1/7143* (2013.01); *H04B 1/713* (2013.01); *H04B 1/7136* (2013.01)
USPC ........................................ 370/343

(58) Field of Classification Search
None
See application file for complete search history.

(56) References Cited

U.S. PATENT DOCUMENTS

2004/0070491 A1* 4/2004 Huang et al. ............. 340/10.5
2004/0240526 A1* 12/2004 Schmandt et al. ............ 375/135

(Continued)

FOREIGN PATENT DOCUMENTS

CN           101280649 A        10/2008
DE   10 2004 062 506            7/2006

(Continued)

OTHER PUBLICATIONS

International Search Report Issued Jul. 8, 2011 in PCT/IB11/00424 Filed Mar. 1, 2011.

*Primary Examiner* — Christopher Crutchfield
(74) *Attorney, Agent, or Firm* — Oblon, Spivak, McClelland, Maier & Neustadt, L.L.P.

(57) ABSTRACT

A mobile device includes a transmitting unit that, each time an ON operation of a switch in a first mode is performed, transmits a wireless signal corresponding to the first mode ON operation by changing a frequency band among three or more frequency bands and that, when an ON operation of the switch in a second mode is performed, transmits a wireless signal, corresponding to the second mode ON operation, in the frequency band selected at that time. The transmitting unit includes a frequency band computing unit that selects one of the three or more frequency bands through a computation for changing a communication environment when the second mode ON operation of the switch is repeatedly performed. A receiver of the in-vehicle device receives a wireless signal transmitted from the transmitting unit and recognizes command information allocated in advance in correspondence with each ON operation mode of the switch.

10 Claims, 7 Drawing Sheets

(56) References Cited

U.S. PATENT DOCUMENTS

| | | |
|---|---|---|
| 2006/0041655 A1* | 2/2006 | Holloway et al. ............. 709/223 |
| 2006/0109079 A1 | 5/2006 | Mack |
| 2006/0148456 A1* | 7/2006 | Chuey ...................... 455/414.1 |
| 2007/0079012 A1* | 4/2007 | Walker ......................... 709/249 |
| 2008/0287067 A1 | 11/2008 | Kawamura et al. |
| 2008/0315988 A1 | 12/2008 | Sikora et al. |
| 2012/0062468 A1* | 3/2012 | Chen et al. ................... 345/173 |

FOREIGN PATENT DOCUMENTS

| | | |
|---|---|---|
| EP | 1 978 667 | 10/2008 |
| EP | 2 007 022 | 12/2008 |
| JP | 6 326660 | 11/1994 |
| JP | 2001 103561 | 4/2001 |
| JP | 2003 87270 | 3/2003 |
| JP | 2010 226426 | 10/2010 |

\* cited by examiner

| FREQUENCY BAND | NUMBER OF SUCCESSFUL COMMUNICATIONS |
|---|---|
| Ch1 | 12 |
| Ch2 | 13 |
| Ch3 | 8 |
| Ch4 | 15 |
| ⋮ | ⋮ |
| | |
| | |
| | |

WIRELESS COMMUNICATION SYSTEM AND COMMUNICATION METHOD FOR WIRELESS COMMUNICATION SYSTEM

INCORPORATION BY REFERENCE

The disclosure of Japanese Patent Application No. 2010-046238 filed on Mar. 3, 2010, including the specification, drawings and abstract is incorporated herein by references in its entirety

BACKGROUND OF THE INVENTION

1. Field of the Invention

The invention relates to a wireless communication system and a communication method for the wireless communication system and, more particularly, to a wireless communication system and communication method for the wireless communication system, which are usefully employed for a multichannel remote keyless entry (RKE) system, or the like.

2. Description of the Related Art

Generally, in a wireless communication system, such as the remote keyless entry system, that remotely operates a security device, or the like, through wireless communication, wireless intercommunication is carried out between a mobile device and a communication controller (in-vehicle device). The mobile device has a transmitting and receiving function and is held by a vehicle user. The communication controller (in-vehicle device) also has a transmitting and receiving function and is mounted on a vehicle. Then, through such intercommunication, a door lock of the vehicle is automatically locked or unlocked or a start of an engine is allowed.

Incidentally, such a wireless communication system mostly employs a so-called multichannel system for intercommunication between the mobile device and the in-vehicle device. That is, in this system, one of a plurality of prepared frequency bands is selectively used, and the frequency band used for intercommunication between the mobile device and the in-vehicle device is automatically changed each time the user operates the mobile device. By so doing, even when the intercommunication between the mobile device and the in-vehicle device using the selected frequency band is interfered because of deterioration of a communication environment due to noise, or the like, the frequency band used for the intercommunication is, where appropriate, changed from the frequency band that is significantly influenced by noise to the frequency band that is hardly influenced by noise.

However, when the frequency band (channel) used for the intercommunication between the mobile device and the in-vehicle device is changed each time the user operates the mobile device in this way, the frequency band can be changed in spite of a good communication environment between the mobile device and the in-vehicle device. That is, usually, the operation on the mobile device includes a "short press operation" of a push switch (button switch) provided for the mobile device, a "double short press operation" in which a short press operation is carried out twice within a predetermined period of time, and a "long press operation". The in-vehicle device is configured to, for example, lock or unlock the door lock of the vehicle or start the engine on the basis of a determination as to these types of operation. Therefore, when the in-vehicle device receives a special switch operation, such as a "double short press operation" and a "long press operation", the in-vehicle device changes the frequency band each time the user performs a switch operation. Eventually, this leads to a decrease in the reliability of communication between the mobile device and the in-vehicle device, for example, it is difficult to determine the type of switch operation, particularly, a special switch operation.

For this reason, it has been, for example, proposed that, when a special switch operation, such as a "double short press operation" and a "long press operation", is performed, a frequency band used in an initial switch operation is stored and then the stored frequency band is used to carry out the following intercommunication based on the special switch operation, or the like. However, in this case, when the frequency band used for the "double short press operation", the "long press operation", or the like, that is, the stored frequency band, is interfered by noise, or the like, the frequency band is not reliably changed, so no intercommunication is established between the mobile device and the in-vehicle device.

Then, for example, Japanese Patent Application Publication No. 2001-103561 (JP-A-2001-103561) describes a wireless communication system that detects the receiving electric field intensity in each of a plurality of time slots used for time division multiplex communication between a transmitter and a receiver. Then, only when all the detected receiving electric field intensities in the time slots remain below a predetermined threshold continuously for a prescribed period of time or longer, it is determined that the communication environment is deteriorated and then the frequency band is changed. In this way, with the wireless communication system described in JP-A-2001-103561, the frequency band is changed only when it is determined that the communication environment is deteriorated, so there is no chance to unnecessarily change the frequency band used between the transmitter and the receiver. That is, even when various types of control are performed at the side of the in-vehicle device on the basis of the above described special operations (switch operations) on the mobile device, the high reliability of that communication, that is, the high capability of establishing communication, is also maintained.

Incidentally, in order to change the frequency band on the basis of all the detected receiving electric field intensities in the time slots used for the communication, especially, the time division multiplex communication, between a transmitter, such as a mobile device, and a receiver, such as an in-vehicle device, it is required to monitor all the receiving electric field intensities in the time slots used for those communications, so the configuration of the wireless communication system also becomes complex. That is, although it is intended to handle the above described special operations (switch operations) of the mobile device, the cost of the system for handling the special operations is not negligible, so there is still room for improvement in application to the remote keyless entry system, or the like.

SUMMARY OF INVENTION

The invention provides a wireless communication system and a communication method for the wireless communication system, which are able to maintain the high capability of establishing communication between a transmitter and a receiver with a further simple configuration.

An aspect of the invention provides a multichannel wireless communication system. The multichannel wireless communication system includes: a transmitter that has a manually operable switch, wherein, each time an ON operation of the switch in a predetermined first mode is performed, the transmitter changes a frequency band among a plurality of predetermined frequency bands to transmit a wireless signal corresponding to the ON operation in the first mode, and, when an ON operation of the switch in a second mode that is different from the first mode is performed, a wireless signal corresponding to the ON operation in the second mode is transmitted in one of the frequency bands, selected at that time; and a receiver that receives the transmitted wireless signal and that recognizes command information allocated in advance in correspondence with each of the ON operations of the switch in the respective modes, wherein the transmitter includes a frequency band computing unit that, when the ON operation of the switch in the second mode is repeatedly performed, selects one of the plurality of predetermined frequency bands through a computation for changing a communication environment.

Another aspect of the invention provides a transmitting method for a wireless communication system. The transmitting method includes: each time an ON operation of a manually operable switch is performed in a predetermined first mode, transmitting a wireless signal corresponding to the ON operation in the first mode by changing a frequency band among a plurality of predetermined frequency bands; when an ON operation of the switch in a second mode that is different from the first mode is performed, transmitting a wireless signal, corresponding to the ON operation in the second mode, in one of the frequency bands, selected at that time; when the ON operation of the switch in the second mode is repeatedly performed, selecting one of the plurality of predetermined frequency bands through a computation for changing a communication environment; and receiving the transmitted wireless signal and recognizing command information allocated in advance in correspondence with each of the ON operations of the switch in the respective modes.

In the above wireless communication system and the transmitting method therefor, the ON operation in the first mode, which is an operation for changing the frequency band among the plurality of predetermined frequency bands, corresponds to a so-called normal channel (frequency band) changing operation, and the ON operation in the second mode, by which a wireless signal corresponding to the ON operation in the that mode is transmitted in the frequency band selected at that time, corresponds to a special operation, such as a "double short press operation" and a "long press operation". Then, when the ON operation in the second mode, which is defined as the above special operation, is repeatedly performed, it is estimated that the. ON operation in the second mode is repeatedly performed because communication between the transmitter and the receiver is not established owing to deterioration of the communication environment. Therefore, as described in the above configuration, through the above estimation, when the frequency band computing unit is used to select one of the plurality of predetermined frequency bands through a computation for changing the communication environment, the function of changing the frequency band in correspondence with the ON operation in the first mode is maintained, while, in the event of deterioration of the communication environment, the frequency band is automatically changed in order to avoid such deterioration of the communication environment. That is, it is possible to maintain the high capability of establishing the communication between the transmitter and the receiver with a simple configuration that does not require addition of special hardware.

In the wireless communication system, the number of the plurality of predetermined frequency bands may be three or more, and the frequency band computing unit, as the computation for changing the communication environment, may learn whether there is a successful communication of a wireless signal based on the ON operation of the switch in the first or second mode for each of the plurality of frequency bands and then may select the frequency band that is determined to have a high communication success rate through the learning as the frequency band when the ON operation of the switch in the second mode is repeatedly performed.

With the above wireless communication system, the frequency band computing unit learns whether there is a successful communication of a wireless signal based on the ON operation of the switch in the first or second mode for each of the plurality of frequency bands as the computation for changing the communication environment. Then, when the learned frequency band having a high communication success rate is selected as the frequency band to which the frequency band is changed when the ON operation of the switch in the second mode is repeatedly performed, the frequency band having a high probability of being able to avoid deterioration of the communication environment is automatically selected under a situation that the communication environment is presumed to deteriorate.

Note that the aspect of the invention is particularly effective when the number of the plurality of predetermined frequency bands is three or more as described in the above configuration. That is, when the above three or more frequency bands are prepared, the accuracy of the learning is enhanced, and a choice of frequency bands to which the frequency band is changed is increased.

In the wireless communication system, the frequency band computing unit may include a storage device that accumulatively stores the number of successful communications of a wireless signal based on the ON operation of the switch in the first or second mode for each of the plurality of frequency bands, and the frequency band computing unit, as the learning, may obtain the frequency band having the largest number of successful communications accumulatively stored in the storage device and may select the obtained frequency band as the frequency band when the ON operation of the switch in the second mode is repeatedly performed.

With the above wireless communication system, when the number of successful communications of a wireless signal based on the ON operation of the switch in the first or second mode is accumulatively stored for each of the frequency bands, it is possible to easily obtain the frequency band having a large number of successful communications among the frequency bands actually used between the transmitter and the receiver.

In the wireless communication system, the frequency band computing unit may include a storage device that stores the frequency band in which communications of wireless signals based on the ON operations of the switch in the first and second modes are successful, and the frequency band computing unit, as the learning, may load the frequency band stored in the storage device and may select the loaded frequency band as the frequency band when the ON operation of the switch in the second mode is repeatedly performed.

The frequency band in which communications of wireless signals based on the ON operations of the switch in the first and second modes between the transmitter and the receiver are once successful has a high possibility of establishing communication at the time of the ON operation in the second mode thereafter. Then, as described in the above configuration, the frequency band in which communications are successful is stored, for example, a new frequency band is preferentially stored when there is a plurality of storage areas, and a frequency band is overwritten when there is one storage area, and then the stored frequency band, that is, the immediately preceding (latest) learned value, is selected as the frequency band when the ON operation in the second mode is repeatedly performed. By do doing, it is possible to simply select the frequency band having a high possibility of establishing communication.

In the wireless communication system, when the frequency band selected through the learning is the same as the frequency band when the ON operation of the switch in the second mode is repeatedly performed, the frequency band computing unit may also execute second candidate learning in which the frequency band other than the selected frequency band is selected as a second candidate.

With the above wireless communication system, when the frequency band selected through the learning is the same as the frequency band when the ON operation of the switch in the second mode is repeatedly performed, the frequency band other than the selected frequency band is selected as a second candidate. By so doing, when the ON operation in the second mode is repeatedly performed, the frequency band that is influenced by deterioration of the communication environment is excluded, and the frequency band learned as the second candidate is selected, so a high degree of reliability over selection of the frequency band based on the learning is also maintained. Note that, in this case, in the wireless communication system, a plurality of storage areas of the storage device are prepared, and a learned value (frequency band information) is not overwritten in one storage area.

In the wireless communication system, whether there is a successful communication of a wireless signal based on the ON operation of the switch in the first or second mode for each of the plurality of frequency bands may be determined as whether command information allocated in advance in correspondence with each of the ON operations in the first and second modes is recognized by the receiver.

With the above wireless communication system, when whether there is a successful communication of a wireless signal based on the ON operation in the first or second mode for each of the plurality of frequency bands is determined as whether command information allocated in advance in correspondence with each of the ON operations in the first and second modes is recognized by the receiver, it is possible to determine that communication is successful on the basis of whether command information is reliably conveyed from the transmitter to the receiver. Thus, intercommunication with the receiver is required; however, it is possible to learn the frequency band having a high possibility of establishing communication with high accuracy and, by extension, the high capability of establishing communication by selecting the learned frequency band is also maintained.

In the wireless communication system, whether there is a successful communication of a wireless signal based on the ON operation of the switch in the first or second mode for each of the plurality of frequency bands may be determined as whether no ON operation of the switch in the second mode is repeatedly performed.

With the above wireless communication system, when the frequency band computing unit provided for the transmitter is used to learn whether there is a successful communication of a wireless signal for each of the plurality of frequency bands, whether there is the successful communication may be determined only by the transmitter. By so doing, it is possible to further quickly and easily learn whether there is a successful communication.

In the wireless communication system, the number of the plurality of predetermined frequency bands may be three or more, and the frequency band computing unit, as the computation for changing the communication environment, may perform a shift operation starting from the frequency band selected at that time from among the three or more frequency bands and then may select the frequency band resulting from the shift operation as the frequency band when the ON operation of the switch in the second mode is repeatedly performed.

With the above wireless communication system, when the ON operation of the switch in the second mode is repeatedly performed, the frequency band used for the wireless communication is changed, that is, the communication environment is changed, through a shift operation starting from the frequency band selected at that time among the three or more frequency bands. By so doing, when deterioration of the communication environment is estimated, the communication environment is reliably changed in a stepwise manner. Note that, in this aspect of the invention as well, the number of the plurality of predetermined frequency bands is desirably three or more, and, by so doing, the frequency bands to which the frequency band is changed, that is, a choice of the communication environments, is also appropriately increased.

In the wireless communication system, the ON operation of the switch in the first mode may be a single short-time ON operation of which a duration does not reach a predetermined period of time, and the ON operation of the switch in the second mode may be at least one of multiple short-time ON operations within a predetermined period of time and a single long-time ON operation of which a duration exceeds a predetermined period of time.

By setting or defining various ON operation modes of the switch, used for the above multichannel system, those ON operation modes of the switch, which are transmitted as wireless signals, may be accurately recognized by the receiver. Incidentally, the "single short-time ON operation of which a duration does not reach a predetermined period of time", which corresponds to the ON operation in the first mode, is an ON operation normally employed for changing the frequency band. In addition, the "multiple short-time ON operations within a predetermined period of time", which correspond to the ON operation in the second mode, are, for example, one of special operations including the above described "double short press operation", and the "single long-time ON operation of which a duration exceeds a predetermined period of time" is also, for example, one of special operations including the above described "long press operation". Note that, in these ON operations, the respective predetermined periods of time need not be the same period of time.

In addition, in the wireless communication system, when the ON operation of the switch in the first mode is performed, the transmitter may also use the frequency band computing unit to change the frequency band after a lapse of the corresponding predetermined period of time, and may transmit the wireless signal in the frequency band selected using the frequency band computing unit.

With the above wireless communication system, when the ON operation of the switch in the first mode is performed as well, a wireless signal is transmitted in the frequency band selected by the frequency band computing unit in order to change the frequency band after a lapse of the corresponding predetermined period of time. By so doing, it is possible to change the communication environment through the computation made by the frequency band computing unit in any of the ON operation in the first mode and the ON operation in the second mode, the wireless communication system may be expected to further improve the capability of establishing communication.

In the wireless communication system, the transmitter may be part of a mobile device that constitutes a remote keyless entry system of a vehicle, and the receiver may be part of an in-vehicle device that constitutes the remote keyless entry system of the vehicle.

The aspects of the invention are particularly effective when the transmitter is used as part of the mobile device that constitutes the remote keyless entry system of the vehicle and the receiver is used as part of the in-vehicle device that constitutes the remote keyless entry system. By so doing, the remote keyless entry system of the vehicle guarantees the high-level capability of establishing communication.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Figure 1:
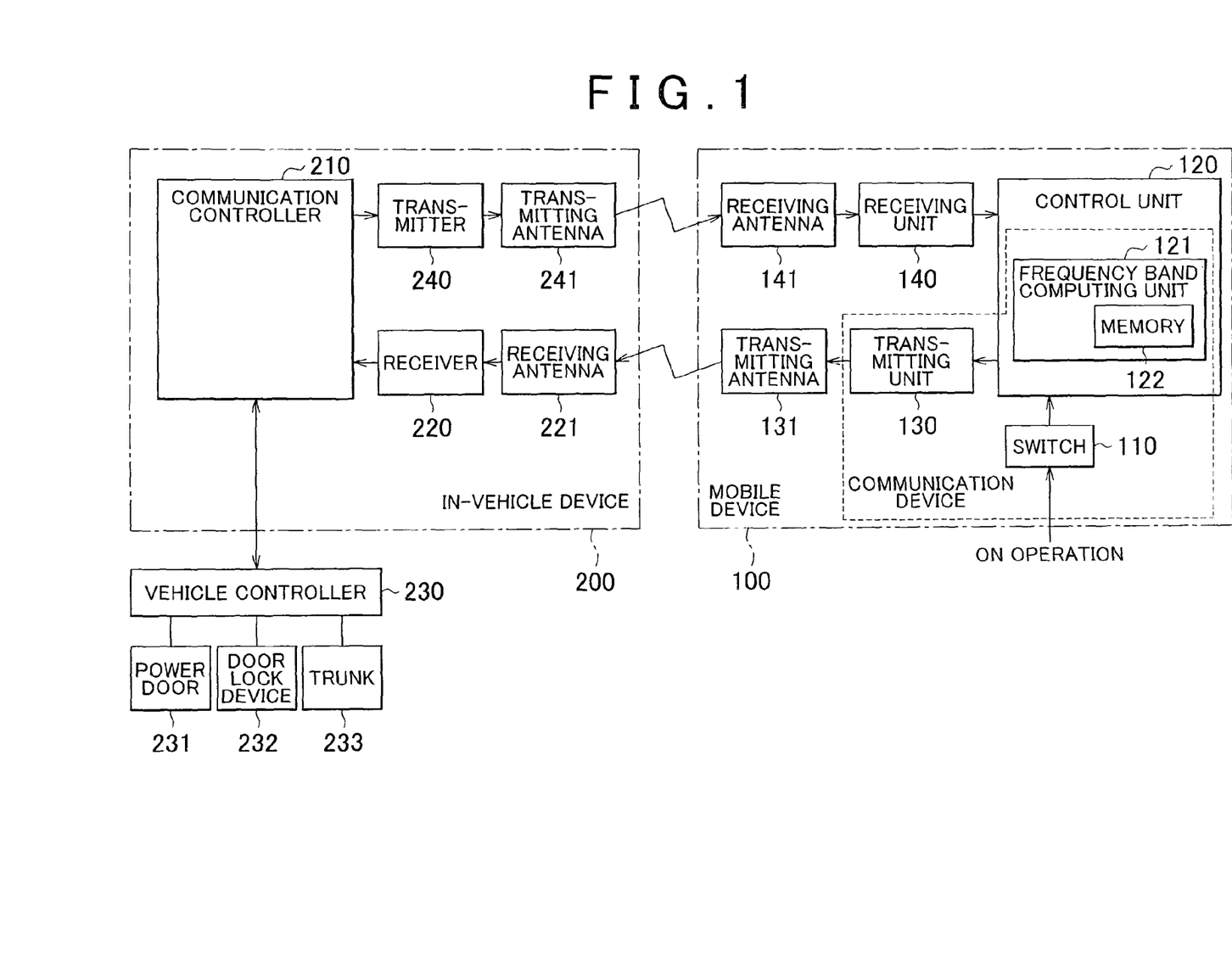
FIG. 1 is a block diagram that shows the configuration of a wireless communication system according to an embodiment of the invention.

Hereinafter, a wireless communication system according to an embodiment of the invention will be described with reference to FIG. 1 to FIG. 8. Note that the wireless communication system according to the present embodiment employs a multichannel system in which three or more frequency bands are used for transmission and reception of wireless communication, and is used for a remote keyless entry system that remotely operates to lock or unlock a door, trunk, or the like, of a vehicle from a mobile device. The door, trunk, or the like, is a controlled object and is equipped for the vehicle. That is, as shown in FIG. 1, the wireless communication system mainly includes a mobile device 100 and an in-vehicle device 200. The mobile device 100 is held by a user in order to remotely operate to, for example, lock or unlock the door, trunk, or the like, of the vehicle. The in-vehicle device 200 is mounted on the vehicle. The in-vehicle device 200 recognizes the operation details through wireless communication with the mobile device 100, and, where necessary, issues a control command for, for example, locking or unlocking the door, trunk, or the like, of the vehicle.

The mobile device 100 includes a switch 110 that is depressed (ON operation) by the user of the vehicle for the remote operation. The switch 110 is a normally off and automatic return push switch (button switch). While the ON operation of the switch 110 is performed by the user, the switch 110 is maintained in an on state; whereas, while no ON operation of the switch 110 is performed by the user, the switch 110 automatically returns to an off state.

Here, an example of prescribed operation modes (command information) of the switch 110 in the present embodiment will be described with reference to FIG. 2. First, as shown in the top time chart and middle time chart of FIG. 2, an ON operation in a manner in which the duration during which the switch 110 is held ON does not reach a predetermined period of time Ta is prescribed as a "short-time ON operation (short press operation)". Then, as shown in the top time chart of FIG. 2, an operation in which the short-time ON operation is performed once within a predetermined period of time Tb for identifying the number of the short-time ON operations, that is, "single short press operation", is, for example, prescribed as an operation for locking or unlocking a door lock of the vehicle. In addition, as shown in the middle time chart of FIG. 2, an operation in which the short-time ON operation is performed twice within the predetermined period of time Tb, that is, "double short press operation", is, for example, prescribed as an operation for locking or unlocking the trunk of the vehicle.

Figure 2:
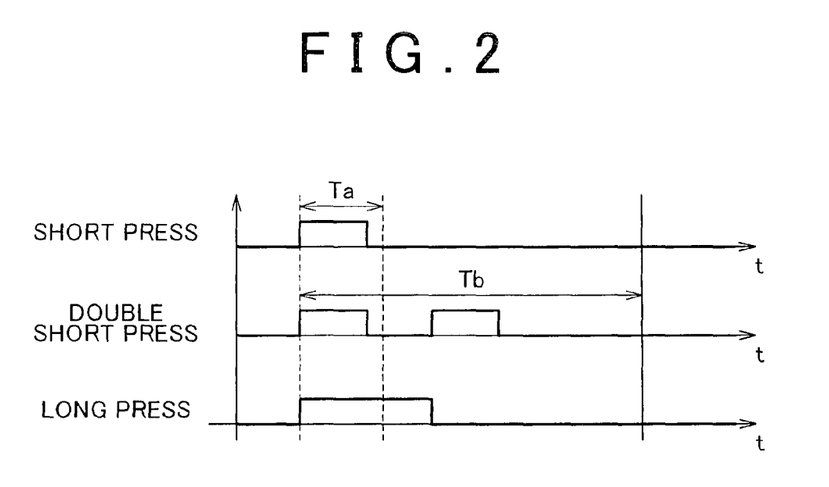
FIG. 2 shows time charts that illustrate various ON operation modes of a mobile device switch, which are employed in the embodiment.

On the other hand, as shown in the bottom time chart of FIG. 2, an ON operation in a manner in which the duration during which the switch 110 is held ON is longer than or equal to the predetermined period of time Ta is prescribed as a "long-time ON operation (long press operation)". Then, in the present embodiment, an operation in which the long-time ON operation is performed once within the predetermined period of time Tb, that is, "single long press operation", is, for example, prescribed as an operation for opening or closing a power door of the vehicle.

Note that, in the present embodiment, each time the "single short press operation" is performed as an ON operation in a first mode, a frequency band used for the wireless communication between the mobile device 100 and the in-vehicle device 200 is automatically changed among the predetermined three or more frequency bands. On the other hand, when any one of the "double short press operation" and the "single long press operation" is performed as an ON operation in a second mode, which is a kind of special operation, in order not to impair the in-vehicle device 200 from recognizing those operation modes, the frequency band is not automatically changed.

Then, when the ON operations of the switch 110 in the respective modes are performed by the user, operation signals corresponding to the respective ON operation modes are input to a control unit 120 via the switch 110 (FIG. 1). The control unit 120 includes a frequency band computing unit 121. The frequency band computing unit 121 estimates that a communication environment has deteriorated when the "double short press operation" or the "single long press operation", which serves as the ON operation in the second mode, is repeatedly performed, and selects one of the plurality of predetermined frequency bands through a computation for changing the communication environment. More specifically, the frequency band computing unit 121 learns whether there is a successful communication of a wireless signal based on the ON operation of the switch 110 between the mobile device 100 and the in-vehicle device 200, and accumulatively stores the number of successful communications of a wireless signal in a memory 122 for each of the frequency bands. By so doing, the frequency band having the largest number of successful communications is selected from among the frequency bands. With such operation of the frequency band computing unit 121, the number of successful communications of a wireless signal based on the ON operation of the switch 110 is sequentially stored in the memory 122 as an accumulated value for each of the three or more frequency bands.

Figure 3:
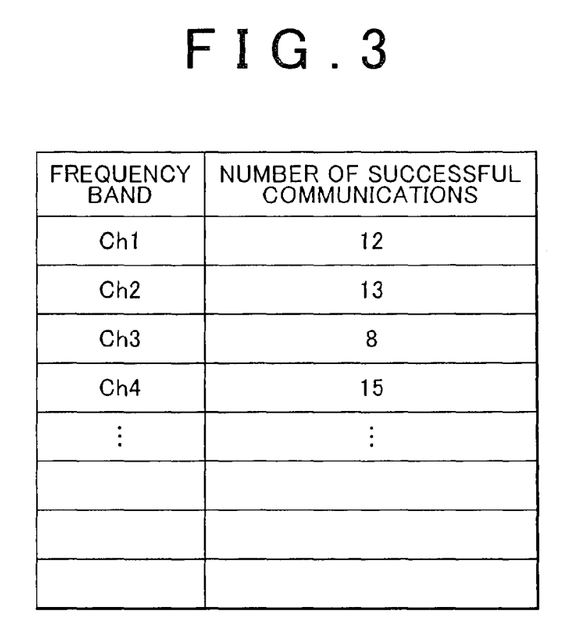
FIG. 3 is a view that shows an example of the data structure of the number of successful communications accumulatively stored in an internal memory of the mobile device according to the embodiment.

FIG. 3 schematically illustrates the structure of storing learned data in the memory 122. As illustrated in FIG. 3, the number of established communications is counted and stored in the memory 122 for each of transmittable frequency bands Ch1 to Ch4 . . . The number of established communications is progressively counted for each of the frequency bands Ch1 to Ch4 . . . by the frequency band computing unit 121 on the basis of information about established communication, transmitted from the in-vehicle device 200 to the mobile device 100, when the intercommunication between the mobile device 100 and the in-vehicle device 200 is established. Then, in this example, the frequency band Ch4 is selected by the frequency band computing unit 121 as the frequency band having the highest probability of establishing communication, that is, the frequency band having the largest number of successful communications, among the frequency bands Ch1 to Ch4 . . . that may be transmitted by the mobile device 100.

In this way, in the mobile device 100, each time the "single short press operation" of the switch 110 is performed by the user, the frequency band used for wireless communication is changed by the control unit 120 among the predetermined frequency bands, and the wireless signal corresponding to the "single short press operation" is transmitted to the in-vehicle device 200 via a transmitting unit 130 and a transmitting antenna 131. Note that changing the frequency band at this time is, for example, sequentially shifting the frequency band among the prepared frequency bands. In addition, when the "double short press operation" or the "single long press operation" is performed in a normal operation mode, the wireless signal corresponding to the "double short press operation" or the "single long press operation" is transmitted to the in-vehicle device 200 via the transmitting unit 130 and the transmitting antenna 131 using the frequency band set at that time. On the other hand, when the "double short press operation" or the "single long press operation" is repeatedly performed, the wireless signal corresponding to the "double short press operation" or the "single long press operation" is transmitted to the in-vehicle device 200 via the transmitting unit 130 and the transmitting antenna 131 using the frequency band that is obtained through a learning computation made by the frequency band computing unit 121.

In addition, the mobile device 100 includes a receiving antenna 141 and a receiving unit 140 that are used to respond to wireless communication transmitted from the mobile device 100 or to receive wireless communication transmitted from the in-vehicle device 200 in order to perform periodical verification with the mobile device 100. Then, a wireless signal received via the receiving unit 140 and the receiving antenna 141 is input to the control unit 120, and the number of established communications is incremented by the frequency band computing unit 121.

Note that, in the present embodiment, as shown in FIG. 1, a transmitter that serves as the mobile device 100 includes the switch 110, part of the control unit 120 including the frequency band computing unit 121, and the transmitting unit 130.

On the other hand, in the in-vehicle device 200 that carries out communication with the mobile device 100, a wireless signal transmitted from the mobile device 100 is acquired by a receiver 220 via a receiving antenna 221. The receiver 220 performs receiving process on the wireless signal transmitted from the mobile device 100, and recognizes command information allocated in advance in correspondence with each of the ON operations of the switch 110 on the basis of the received wireless signal. Note that the receiver 220 is able to receive wireless communication transmitted from the mobile device 100 using a plurality of frequency bands by appropriately changing the receivable frequency band at a predetermined time interval. Then, the command information recognized by the receiver 220 is input to a communication controller 210. The communication controller 210 prompts control over in-vehicle equipment in response to the command information.

The communication controller 210 conveys a command for prompting a vehicle controller 230 to, for example, lock or unlock a power door 231, door lock device 232 or trunk 233, which serves as a controlled object, in response to the command information from the mobile device 100, recognized by the receiver 220. That is, when the "single long press operation" is input to the switch 110, the vehicle controller 230 receives the command corresponding to the "single long press operation" and then executes control to open or close the power door 231. In addition, when the "single short press operation" is input to the switch 110, the vehicle controller 230 receives the command corresponding to the "single short press operation" and then executes control to lock or unlock the door lock device 232. On the other hand, when the "double short press operation" is input to the switch 110, the vehicle controller 230 receives the command corresponding to the "double short press operation" and then executes control to lock or unlock the trunk 233.

Then, wireless communication as to whether communication is established between the in-vehicle device 200 and the mobile device 100 and wireless communication for periodical verification as to whether a communication device that has carried out wireless communication with the in-vehicle device 200 conforms to the specifications of the in-vehicle device 200 are transmitted to the mobile device 100 via a transmitting antenna 241 using a frequency band that is specified by a transmitter 240 in advance.

Next, the procedure of setting a frequency band, executed by the control unit 120 (transmitter) that constitutes the mobile device 100, will be described. First, the case where the above described "long press operation" is set as a special operation of the switch 110 will be described with reference to FIG. 4.

Figure 4:
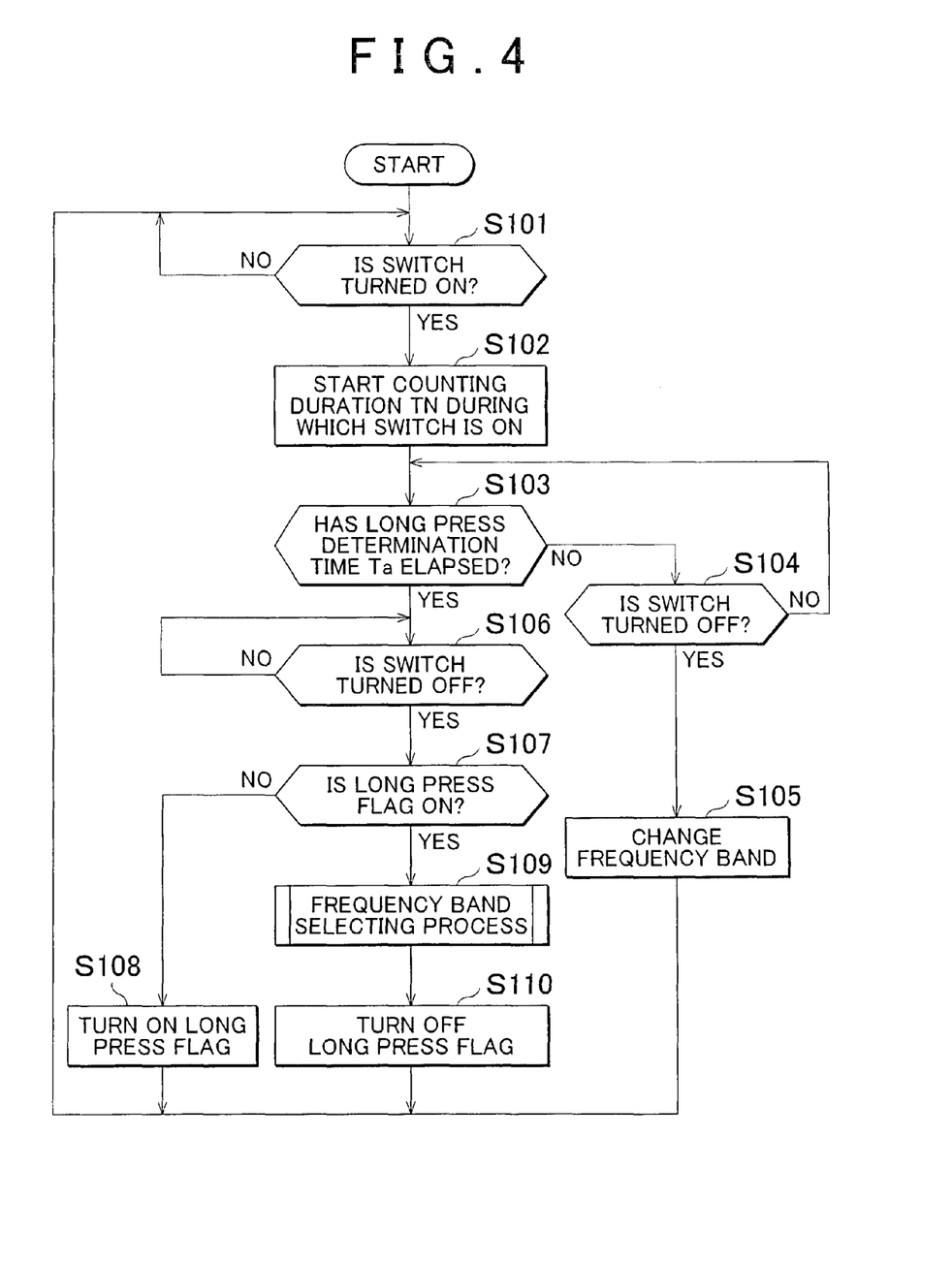
FIG. 4 is a flowchart that shows a first example of the procedure of setting a communication frequency band according to the embodiment.

As shown in FIG. 4, first, in step S101, it is determined whether the switch 110 is turned on by a user. That is, the control unit 120 determines whether the operation signal is input via the switch 110.

In this way, when the switch 110 is turned on by the user, counting a duration TN during which the switch 110 is in an on state is started (step S102), and it is determined whether the duration TN has reached a long press determination time Ta (FIG. 2) in order to determine which one of the above described "short press operation" and "long press operation" of the switch 110 is performed (step S103). Then, when the switch 110 held ON is turned off before the long press determination time Ta elapses, it is determined that the operation is the "short press operation", and then the above described process of changing the frequency band is performed (steps S104 and S105).

On the other hand, when the duration TN of the switch 110 reaches the long press determination time Ta, it is determined that the ON operation of the switch 110 is the "long press operation". At this time, it is determined whether the "long press flag" is ON at the timing at which the switch 110 is turned off (steps S106 and S107), and then the "long press flag" is turned on under the condition that the "long press flag" is not ON (step S108). Note that, when it is determined that the ON operation is the "long press operation" in this way, a long press bit that is a bit indicating that the long press operation is performed is added to the operation signal, and then an operation signal to which the long press bit is added (long press operation signal) is output from the control unit 120 to the transmitting unit 130. Then, the long press operation signal is output until the switch 110 that is once turned on by the user is turned off.

Furthermore, on the other hand, when it is determined in step S107 that the "long press flag" is ON, that is, it is determined that the "long press operation" is successively performed again, it is estimated that the long press operation is repeatedly performed by the user because the currently selected frequency band is interfered owing to the influence of noise, or the like, and, as a result, the first "long press operation" is not established. Then, in the present embodiment, in order to change the above communication environment, the frequency band computing unit 121 executes frequency band selecting process in the above manner (step S109).

Then, the communication environment, that is, the frequency band, is changed through the frequency band selecting process and then the long press flag is turned off (step S110). After that, the process is placed on standby until the ON operation of the switch 110 is performed.

In this way, in the present embodiment, during a period from when the first (initial) "long press operation" is performed to when the "short press operation" or the second "long press operation" is performed, the frequency band transmitted from the transmitter is fixed to the same frequency band. On the other hand, when the "long press operation" is repeatedly performed, it is determined that the intercommunication between the mobile device 100 and the in-vehicle device 200 is interfered owing to the influence of noise, or the like, so the communication environment is changed by changing (selecting) the frequency band. By so doing, in order to establish communication through the special operation, that is, the "long press operation", it is possible to establish the intercommunication between the mobile device 100 and the in-vehicle device 200 with less number of operations.

Figure 5:
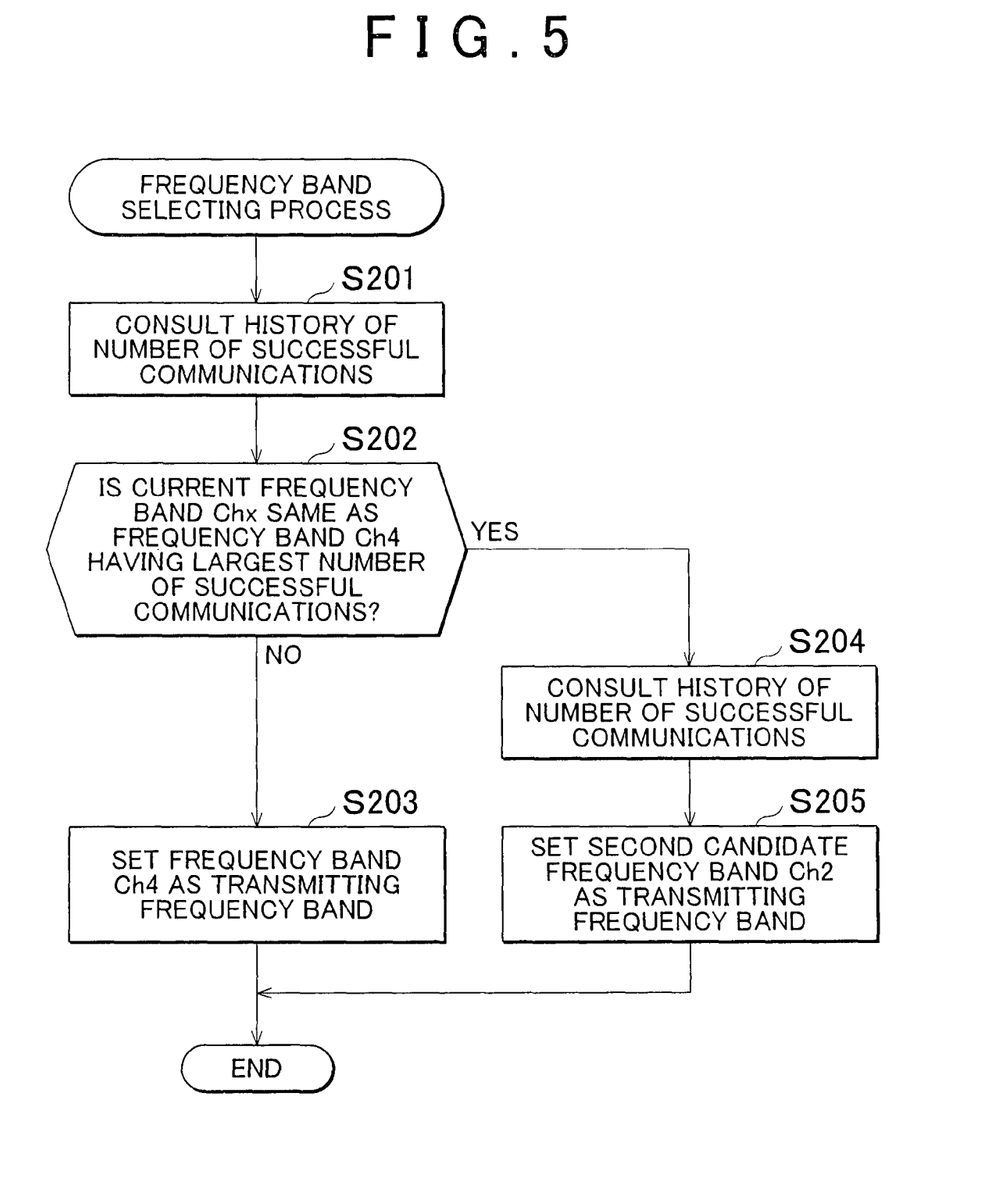
FIG. 5 is a flowchart that shows the procedure of communication frequency changing process executed by a frequency band computing unit according to the embodiment.

Next, the procedure of the frequency band selecting process will be described with reference to FIG. 5. First, when it is determined that the "long press operation" of the switch 110 is repeatedly performed (YES in step S107 of FIG. 4), the memory 122 is consulted and then the frequency band having the largest number of successful communications (in this example, "Ch4") accumulatively stored for each of the frequency bands Ch1 to Ch4 . . . is obtained in step S201.

Then, it is determined whether the frequency band Chx used for the communication between the mobile device 100 and the in-vehicle device 200 at this time is the same as the obtained frequency band Ch4 (step S202). As a result of the determination, when the frequency band Chx differs from the frequency band Ch4, the frequency band Ch4 is selected as the frequency band that is used for the communication and that is appropriate to improve the communication environment (steps S202 and S203).

On the other hand, when the frequency band Chx is the same as the frequency band Ch4, it is determined that there is a low possibility of establishing communication in the current communication environment even when the frequency band Ch4 is used, and then the memory 122 is consulted again (steps S202 and S204). Subsequently, by consulting the memory 122, the frequency band having the second largest number of successful communications, following the frequency band Ch4, is selected as the frequency band that is used for the communication and that is appropriate to improve the communication environment (step S205).

In this way, the frequency band used for the wireless communication carried out by the mobile device 100 is changed from the frequency band Chx that has a high possibility of receiving the influence of noise, or the like, to the frequency band that has the highest possibility of establishing communication among the three or more predetermined frequency bands.

Hereinafter, the manner in which the frequency band transmitted by the transmitter of the mobile device 100 is changed will be more specifically described with reference to FIG. 6. Note that, in FIG. 6, the top time chart shows an example of changes in ON/OFF mode of the switch 110, and the middle time chart shows an example of changes in frequency band transmitted from the mobile device 100. In addition, the bottom time chart shows an example of changes in the long press flag.

Figure 6:
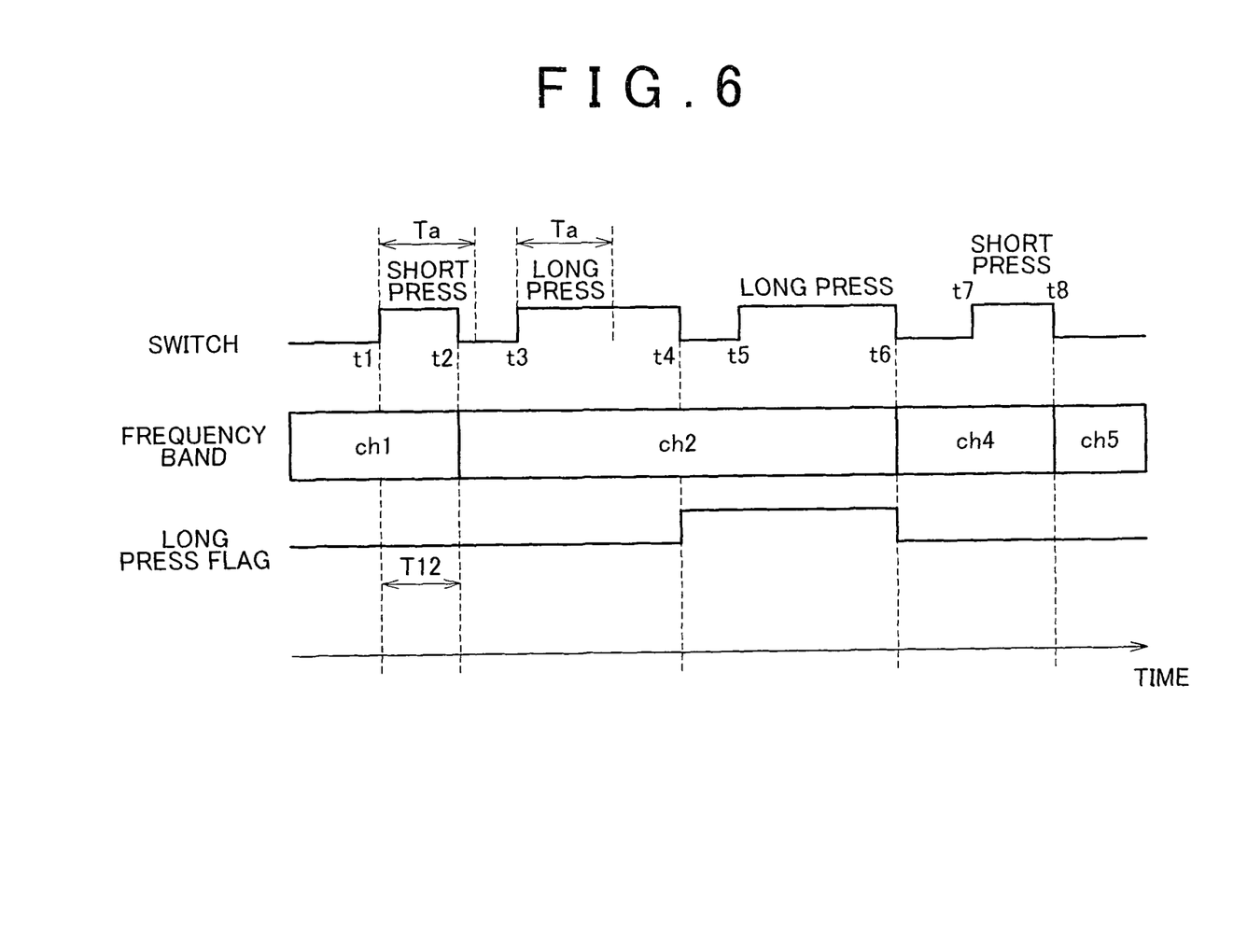
FIG. 6 shows time charts for the first example, in which the top time chart shows an example of changes in the ON operation mode of the switch; the middle time chart shows an example of changes in frequency band used for the wireless communication between a transmitter and a receiver and the bottom time chart shows an example of changes in long press flag.

First, as shown in the top time chart of FIG. 6, the switch 110 is held ON by the user from the timing t1 to the timing t2. Then, a period of time T12 during which the switch 110 is held ON is shorter than the long press determination time Ta, so it is determined that the operation performed by the user is the "short press operation". As a result, at the timing t2, the frequency band transmitted from the mobile device 100 is, for example, changed from the frequency band Ch1 to the frequency band Ch2, and wireless communication corresponding to the "short press operation" is carried out.

Subsequently, when the first "long press operation" is performed from the timing t3 to the timing t4, wireless communication corresponding to the first "long press operation" is carried out in a state where the frequency band in which wireless communication is transmitted from the mobile device 100 is fixed, and, as shown in the bottom time chart of FIG. 6, the long press flag is turned on in synchronization with the timing t4 at which the switch 110 is turned off. Then, when the second "long press operation" is further performed from the timing t5 to the timing t6, the frequency band set in the control unit 120 is changed at the timing t6 from the frequency band Ch2 to the frequency band Ch4 accumulatively stored in the memory 122. Note that, as is apparent from the middle time chart of FIG. 6, the frequency band, other than the frequency band Ch2 when the second "long press operation" is performed, is selected at this time.

Then, when the "short press operation" is performed from the timing t7 to the timing t8, the frequency band set in the control unit 120 is changed at the timing t8 from Ch4 to Ch5 and then wireless communication corresponding to the "short press operation" is carried out.

Next, the procedure of setting the frequency band, executed by the control unit 120 (transmitter) that constitutes the mobile device 100, in the case where multiple "short press operations" within the above described predetermined period of time are set as the special operation of the switch 110 will be described with reference to FIG. 7. Note that the details other than the following description are the same as those described with reference to FIG. 4 and FIG. 5.

Figure 7:
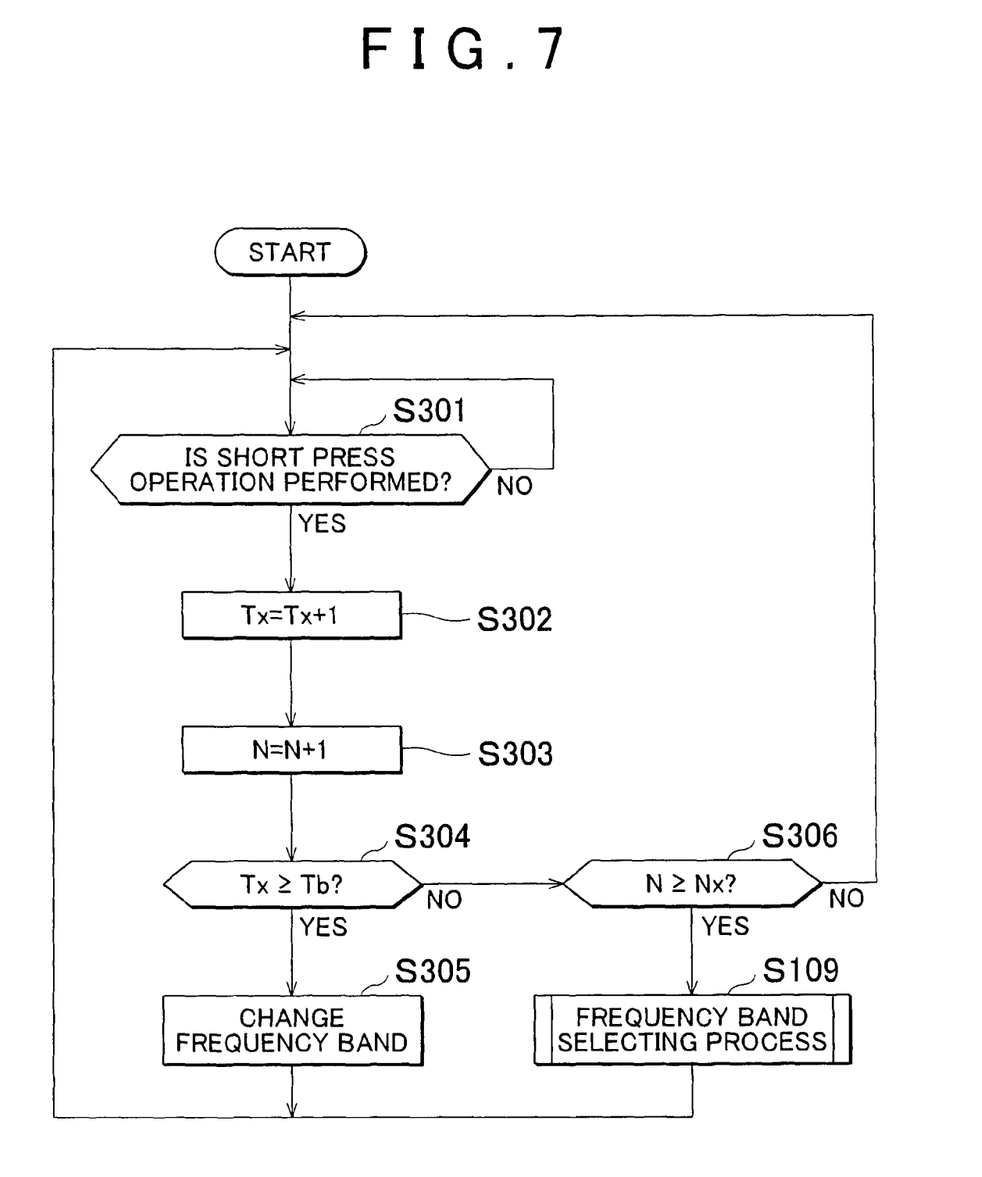
FIG. 7 is a flowchart that shows a second example of the procedure of setting a communication frequency band according to the embodiment.

That is, as shown in FIG. 7, first, when the initial ON operation ("short press operation") of the switch 110 is performed by the user in step S301, counting a duration Tx for determining whether the predetermined period of time Tb shown in FIG. 2 has elapsed from when the "short press operation" is performed is started (step S302). Then, a counted value N for measuring the number of times the ON operation of the switch 110 is performed during then is counted (step S303). Note that the initial ON operation is an ON operation that is performed immediately after the frequency band is automatically changed by the transmitting unit 130 or the frequency band is changed to the frequency band that is obtained through a computation made by the frequency band computing unit 121.

In this way, when the duration Tx elapsed from when the "short press operation" is performed is measured and the number of times the "short press operation" is performed is counted, it is determined whether the predetermined period of time Tb has elapsed after the initial "short press operation" (step S304). When it is determined that the predetermined period of time Tb has elapsed, the frequency band is automatically changed, and the process of setting the frequency band is continued (step S305).

On the other hand, when it is determined in step S304 that the predetermined period of time Tb has not elapsed after the initial "short press operation", it is determined whether the number of times N the "short press operation" of the switch 110 is performed becomes larger than or equal to a predetermined value Nx ("four" in this example" (step S306). That is, in this determination, it is determined whether the "double short press operation" is performed twice within the predetermined period of time Tb. Then, as a result of the determination, when it is determined that the counted number of times N of the "short press operation" becomes larger than or equal to the predetermined value Nx, it is estimated that the "double short press operation" is successively performed twice by the user because of deterioration of the communication environment, and then the frequency band selecting process shown in FIG. 5 is executed (step S109 in FIG. 7).

In this way, in this example as well, the frequency band is automatically changed after the predetermined period of time Tb has elapsed from the initial "short press operation". Then, when the number of times the ON operation is performed within the predetermined period of time Tb is equal to or larger than the predetermined value Nx, the communication environment is changed through the process of changing the frequency band on the basis of the above described learning even when the ON operation is the "double short press operation" by which the frequency band is not automatically changed.

Hereinafter, the manner in which the frequency band transmitted by the transmitter in this example is changed will be described with reference to FIG. 8. Note that, in FIG. 8, the top time chart shows an example of changes in ON/OFF mode of the switch 110, and the middle time chart shows an example of changes in the counted value N of the counter. In addition, the bottom time chart shows an example of changes in frequency band transmitted from the transmitting unit 130.

Figure 8:
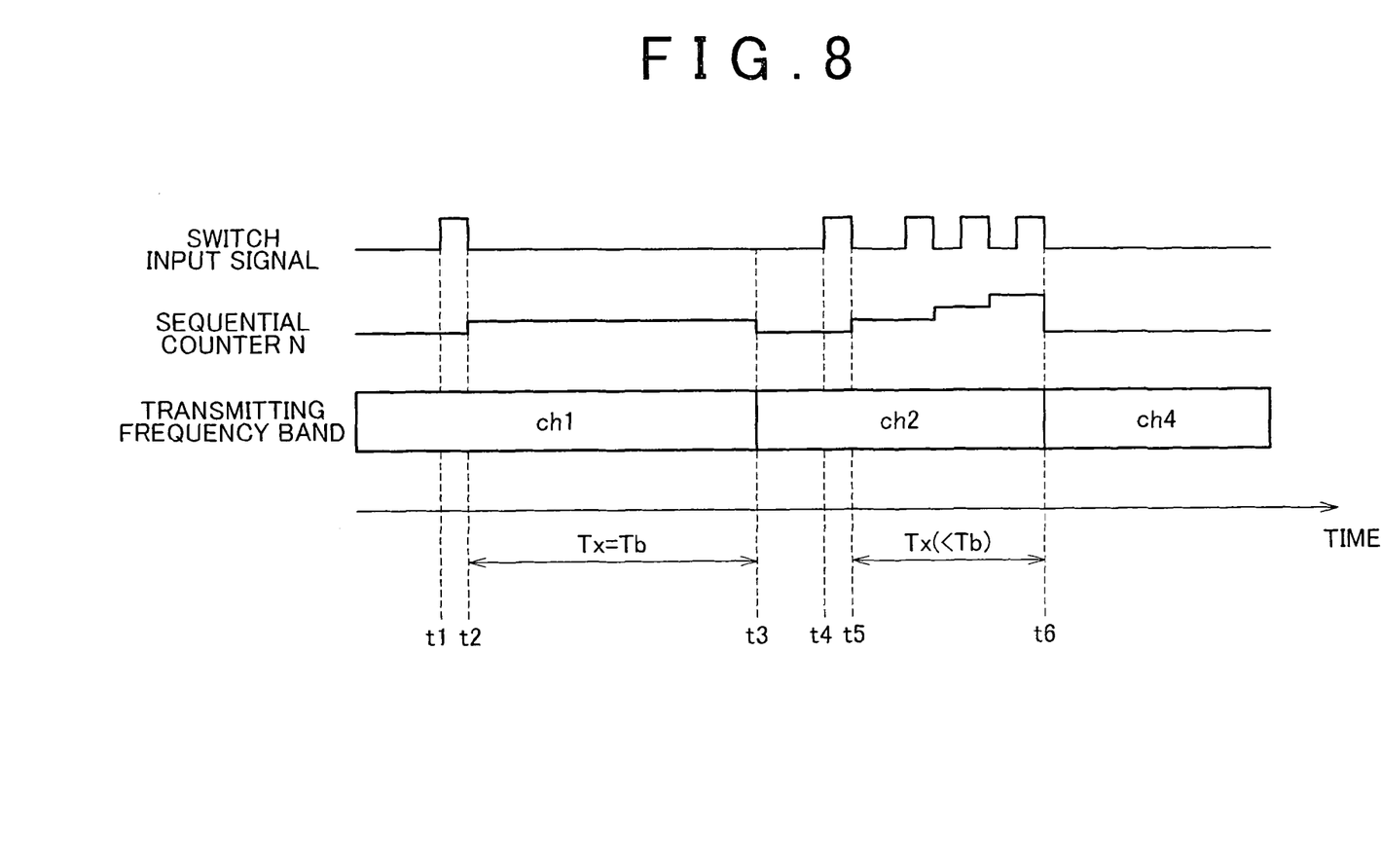
FIG. 8 shows time charts for the second example, in which the top time chart shows an example of changes in the ON operation mode of the switch, the middle time chart shows an example of changes in the number of counts of ON operation and the bottom time chart shows an example of changes in frequency band used for the wireless communication between the transmitter and the receiver.

First, as shown in the top time chart of FIG. 8, when the "short press operation" of the switch 110 is performed by the user from the timing t1 to the timing t2, the frequency band is changed by the mobile device 100 at the time point at which the predetermined period of time Tb has elapsed after the "short press operation" (timing t3). By so doing, the frequency band transmitted from the transmitting unit 130 is, for example, changed from the frequency band Ch1 to the frequency band Ch2, and wireless communication corresponding to the "short press operation" is carried out.

In addition, when the "short press operation" of the switch 110 is performed by the user from the timing t4 to the timing t5, the duration Tx elapsed after the "short press operation" and the number of times N the "short press operation" is performed are counted at the same time. However, in this case, as shown in the middle time chart of FIG. 8, the fourth "short press operation" is performed before the duration Tx elapsed after the "short press operation" elapses (Tx<Tb). Therefore, as shown in the bottom time chart of FIG. 8, at the time point at which the fourth "short press operation" is completed at the timing t6, the frequency band transmitted from the mobile device 100 is changed from the frequency band Ch2 to the frequency band Ch4 through the frequency band selecting process, and wireless communication corresponding to the above operation is carried out. Note that, as is apparent from the bottom time chart of FIG. 8, the frequency band, other than the frequency band Ch2 when the second "long press operation" is performed, is selected at this time.

As described above, with the wireless communication system according to the present embodiment, the following advantageous effects may be obtained.

(1) When the special operation, such as the "long press operation" and the "double short press operation", is repeatedly performed, the communication environment between the mobile device 100 and the in-vehicle device 200 is changed by changing the frequency band used for the wireless communication to the frequency band obtained on the basis of learning made by the frequency band computing unit 121. Therefore, it is possible to estimate deterioration of the communication environment on the basis of the ON operation mode of the switch 110, and the communication environment is improved by changing the communication environment on the basis of the estimation. By so doing, the wireless communication system is able to maintain the high capability of establishing the communication between the mobile device 100 and the in-vehicle device 200 with a simple configuration.

(2) The frequency band that is learned by the frequency band computing unit 121 and that has a high communication success rate obtained by accumulatively storing the number of successful communications in the memory 122 for each of the frequency bands is selected as the frequency band that is selected when the "long press operation" or the "double short press operation" is repeatedly performed. By so doing, when deterioration of the communication environment is estimated, the frequency band having the highest communication success rate is automatically selected from among the three or more frequency bands used for the wireless communication between the mobile device 100 and the in-vehicle device 200. In addition, particularly, by selecting the frequency band using the frequency band computing unit 121 as described above, even when the three or more frequency bands are used for the wireless communication between the mobile device 100 and the in-vehicle device 200, the communication environment is changed to the frequency band that has the highest communication success rate and that is selected from among the plurality of frequency bands.

(3) Whether there is a wireless signal based on the ON operation of the switch 110 for each of the plurality of frequency bands is determined on the basis of whether the command information is recognized by the receiver 220 of the in-vehicle device 200. By so doing, it is possible to determine whether the communication between the mobile device 100 and the in-vehicle device 200 is established on the basis of whether the command information based on the ON operation of the switch 110 is actually conveyed from the mobile device 100 to the in-vehicle device 200.

(4) When the frequency band selected through a computation made by the frequency band computing unit 121 is the same as the frequency band when the special operation, such as the "long press operation" and the "double short press operation", is repeatedly performed, the frequency band other than the selected frequency band is selected as a second candidate. By so doing, the frequency band computing unit 121 is able to select the frequency band on condition that the frequency band that is supposed to be influenced by deterioration of the communication environment is excluded, and, by extension, it is possible to improve the reliability over selection of the frequency band.

(5) The control unit 120 (transmitter) that constitutes the mobile device 100 includes the memory 122 that accumulatively stores the number of successful communications. By so doing, the mobile device 100 integrally has the function of selecting the frequency band and the function of transmitting wireless communication corresponding to that frequency band.

(6) One of conditions for estimating deterioration of the communication environment, that is, one of conditions for selecting the frequency band by the frequency band computing unit 121, is that the "long press operation" is repeatedly performed. By so doing, even when the ON operation of the switch 110 is the "long press operation" by which the frequency band is not automatically changed, it is possible to reset the frequency band on the basis of estimated deterioration of the communication environment, so it is possible to establish the communication between the mobile device 100 and the in-vehicle device 200 with less number of operations.

(7) One of conditions for estimating deterioration of the communication environment, that is, one of conditions for selecting the frequency band by the frequency band computing unit 121, is that the same ON operation is performed multiple times within the predetermined period of time Tb. By so doing, even when the ON operation of the switch 110 is the "double short press operation" by which the frequency band is not automatically changed, it is possible to reset the frequency band on the basis of estimated deterioration of the communication environment, so it is possible to establish the communication between the mobile device 100 and the in-vehicle device 200 with less number of operations.

(8) The function of the transmitter and receiver is provided for the mobile device 100 and the in-vehicle device 200 that constitute the remote keyless entry system of the vehicle. By so doing, the remote keyless entry system of the vehicle is able to guarantee the high-level capability of establishing communication.

Note that the above embodiment may be modified into the following alternative embodiments.

In the above embodiment, when the "long press operation" is repeatedly performed as a first example, it is estimated that the currently selected frequency band is interfered owing to the influence of noise, or the like, and then the frequency band selecting process is executed by the frequency band computing unit 121. However, it is not limited to the above configuration. It is also applicable that the long press flag is reset each time a constant period of time has elapsed after the initial "long press operation" and the frequency band selecting process is executed by the frequency band computing unit 121 only when the "long press operation" is performed twice or more within the constant period of time.

In the above embodiment, when the "short press operation" is performed four times or more within the predetermined period of time Tb as the second example, that is, when the "double short press operation" is repeatedly performed twice within the predetermined period of time Tb, deterioration of the communication environment is estimated and then the frequency band is selected by the frequency band computing unit 121. However, it is not limited to the above configuration. It is also applicable that the frequency band is selected by the frequency band, computing unit 121 when the "double short press operation" is repeatedly performed three times or more within the predetermined period of time Tb. In short, it is only necessary to change the communication environment by selecting the frequency band when the "double short press operation" is repeatedly performed multiple times.

In the above embodiment, when the normal "short press operation" is performed, the frequency band is changed in step S105 as shown in FIG. 4 or in S305 as shown in FIG. 7. In this case as well, the frequency band may be selected by the frequency band computing unit 121.

In the above embodiment, when the "long press operation" is repeatedly performed as the first example, or when the "double short press operation" is repeatedly performed as the second example, the frequency band is selected by the frequency band computing unit 121. Other than the above, of course, it is applicable that, only when any one of the "long press operation" and the "double short press operation" is repeatedly performed, the frequency band is selected by the frequency band computing unit 121.

In the above embodiment, whether there is a successful communication of a wireless signals based on the ON operation of the switch 110 for each of the plurality of frequency bands is determined on the basis of whether the ON operation mode of the switch 110, that is, the "short press operation", the "double short press operation" or the "long press operation", is recognized by the receiver 220 that constitutes the in-vehicle device 200. However, it is not limited to this configuration. It is also applicable that whether there is a successful communication of a wireless signal based on the ON operation of the switch 110 for each of the plurality of frequency bands is determined on the basis of whether no special ON operation of the switch 110 is repeatedly performed. That is, it is applicable that the frequency band in which the "double short press operation" or the "long press operation" has not been repeatedly performed is estimated as one that has a high possibility of establishing communication and then the frequency band having a high possibility of establishing communication is set as the frequency band selected by the frequency band computing unit 121. With the above configuration, without a response of established communication from the in-vehicle device 200 to the mobile device 100, the mobile device 100 is able to determine whether communication based on the ON operation of the switch 110 is established. By so doing, even if the wireless communication between the transmitter and the receiver is a unidirectional communication from the transmitter to the receiver, the transmitter is able to identify the frequency band that has a high possibility of establishing communication and, furthermore, it is possible to select the identified frequency band only by the transmitter.

In the above embodiment, the number of successful communications of a wireless signal based on the ON operation of the switch 110 is accumulatively stored in the memory 122 for each of the plurality of frequency bands, and the frequency band having the largest number of successful communications accumulatively stored in the memory 122 is selected as the frequency band when the "long press operation" or the "double short press operation" is repeatedly performed. However, it is not limited to this configuration. It is also applicable that a storage device that sequentially stores the frequency band, in which communication of a wireless signal based on the ON operation of the switch 110 is successful, in a plurality of areas or overwrites the frequency band in one area is provided for the frequency band computing unit 121 for learning. Then, when the "long press operation" or the "double short press operation" is repeatedly performed, the latest frequency band stored in the storage device may be loaded and then the loaded frequency band may be selected as the frequency band when the "long press operation" or the "double short press operation" is repeatedly performed. By so doing, it is possible to select the frequency band having a high possibility of establishing communication with a further simple computation. Note that, when selecting the above described second candidate frequency band is employed, the storage device having a plurality of storage areas is used.

In the above embodiment, in the frequency band selecting process, the frequency band having the largest number of successful communications among the frequency bands accumulatively stored in the memory 122 is selected as the frequency band when the "long press operation" or the "double short press operation" is repeatedly performed. However, it is not limited to this configuration. It is also applicable that the frequency band computing unit 121 performs a shift operation starting from the frequency band selected at that time from among the three or more frequency bands as a computation for changing the communication environment. For example, when the frequency band used for wireless communication carried out by the mobile device 100 is the frequency band Ch1, a shift operation is performed by the frequency band computing unit 121 starting from the frequency band Ch1 in a manner from the "frequency band Ch2" via the "frequency band Ch3" to the "frequency band Ch4". Then, when the frequency band resulting from the shift operation is selected as the frequency band when the "long press operation" or the "double short press operation" is repeatedly performed, the frequency band other than the frequency band used for the wireless communication is automatically selected when deterioration of the communication environment is estimated.

In the above embodiment, when the "long press operation" or the "double short press operation" is performed repeatedly, specifically, twice, deterioration of the communication environment is determined and then the frequency band is selected by the frequency band computing unit 121. However, it is not limited to this configuration. It is also applicable that, when the "long press operation" or the "double short press operation" is performed three times or more, deterioration of the communication environment is determined and then the frequency band is selected by the frequency band computing unit 121.

In the above embodiment, the predetermined period of time Ta for determining the "long press operation" and the predetermined period of time Tb for counting the "short press operation" are set to different periods of time. Other than the above, it is also applicable that the predetermined period of time Ta for determining the "long press operation" and the predetermined period of time Tb for counting the "short press operation" are set to the same period of time.

In the above embodiment, the mobile device 100 includes the transmitting unit 130 and the receiving unit 140, and the in-vehicle device 200 includes the receiver 220 and the transmitter 240. However, it is not limited to this configuration. It is also applicable that the communication from the mobile device 100 to the in-vehicle device 200 is set as a unidirectional communication in the case where the normal "short press operation" of the switch 110 is set as the ON operation in the first mode and the frequency band is selected in such a manner that deterioration of the communication environment is estimated on the basis of a situation that the special operation, that is, the ON operation in the second mode, is repeatedly performed. That is, according to the aspect of the invention, it is possible to estimate that no communication is established on the basis of the fact that the ON operation of the switch 110 in the second mode is repeatedly performed without receiving whether communication is established from the in-vehicle device 200. In this case, it is possible to further simplify the wireless communication system.

In the above embodiment, the pieces of command information corresponding to the "single long press operation", the "single short press operation" and the "double short press operation" are respectively defined to open or close the power door 231, to lock or unlock the door lock device 232 and to lock or unlock the trunk 233. A combination of the pieces of command information corresponding to these operation modes may be selected, and, for example, the command information corresponding to the "single short press operation" may be defined to lock or unlock the door lock device 232. In addition, other than the above, an object controlled on the basis of the command information of the ON operation of the switch 110 may be a mirror, engine, or the like, of the vehicle.

The three or more frequency bands are used as the predetermined frequency bands used for the wireless communication between the mobile device 100 and the in-vehicle device 200. However, it is not limited to this configuration. It is also applicable that two frequency bands may be used as the predetermined frequency bands used for the wireless communication in the case where the communication environment is changed by selecting the frequency band when the ON operation of the switch 110 in the second mode is repeatedly performed.

In the above embodiment, the "double short press operation" and the "single long press operation" are defined as the ON operation in the second mode. Other than the above, for example, three times or more of the "short press operation" (triple short press operation, or the like) or twice or more of the "long press operation" (double long press operation, or the like) may be defined as the ON operation in the second mode.

In the above embodiment, the wireless communication system is applied to the keyless entry system of the vehicle; instead, the wireless communication system may be applied to a security system of a house, or the like. In short, the aspect of the invention is applicable as long as the command information corresponding to the ON operation of a switch is transmitted or received between the transmitter and the receiver using a plurality of frequency bands.

The invention claimed is:

1. A wireless communication system comprising:
a transmitter configured to have a manually operable switch, each time an ON operation of the switch in a predetermined first mode is performed, to change a frequency band among a plurality of predetermined frequency bands to transmit a wireless signal corresponding to the ON operation in the first mode, and, when an ON operation of the switch in a second mode that is different from the first mode is performed, to transmit a wireless signal corresponding to the ON operation in the second mode in one of the frequency bands selected at that time; and
a receiver configured to receive the transmitted wireless signal and to recognize command information allocated in advance in correspondence with each of the ON operations of the switch in the respective modes,
the transmitter is configured to when the ON operation of the switch in the second mode is repeatedly performed, select one of the plurality of predetermined frequency bands through a computation for changing a communication environment, the number of the plurality of predetermined frequency bands being three or more, the transmitter, as the computation for changing the communication environment, being configured to learn whether there is a successful communication of a wireless signal based on the ON operation of the switch in the first or second mode for each of the plurality of frequency bands and then to select the frequency band that is determined to have a high communication success rate through the learning as the frequency band when the ON operation of the switch in the second mode is repeatedly performed, the transmitter including a storage device configured to accumulatively store the number of successful communications of a wireless signal based on the ON operation of the switch in the first or second mode for each of the plurality of frequency bands, and the transmitter, as the learning, and the transmitter is configured to obtain the frequency band having the largest number of successful communications accumulatively stored in the storage device and to select the obtained frequency band as the frequency band when the ON operation of the switch in the second mode is repeatedly performed.

2. The wireless communication system according to claim 1, wherein the transmitter includes a storage device configured to store the frequency band in which communications of wireless signals based on the ON operations of the switch in the first and second modes are successful, and the transmitter, as the learning, the transmitter is configured to load the frequency band stored in the storage device, and the transmitter is configured to select the loaded frequency band as the frequency band when the ON operation of the switch in the second mode is repeatedly performed.

3. The wireless communication system according to claim 1, wherein when the frequency band selected through the learning is the same as the frequency band when the ON operation of the switch in the second mode is repeatedly performed, the transmitter also executes second candidate learning in which the frequency band other than the selected frequency band is selected as a second candidate.

4. The wireless communication system according to claim 1, wherein whether there is a successful communication of a wireless signal based on the ON operation of the switch in the first or second mode for each of the plurality of frequency bands is determined as whether command information allocated in advance in correspondence with each of the ON operations in the first and second modes is recognized by the receiver.

5. The wireless communication system according to claim 1, wherein whether there is a successful communication of a wireless signal based on the ON operation of the switch in the first or second mode for each of the plurality of frequency bands is determined as whether no ON operation of the switch in the second mode is repeatedly performed.

6. The wireless communication system according to claim 1, wherein the number of the plurality of predetermined frequency bands is three or more, and the transmitter, as the computation for changing the communication environment, performs a shift operation starting from the frequency band selected at that time from among the three or more frequency bands and then selects the frequency band resulting from the shift operation as the frequency band when the ON operation of the switch in the second mode is repeatedly performed.

7. The wireless communication system according to claim 1, wherein the ON operation of the switch in the first mode is a single short-time ON operation of which a duration does not reach a predetermined period of time, and the ON operation of the switch in the second mode is at least one of multiple short-time ON operations within a predetermined period of time and a single long-time ON operation of which a duration exceeds a predetermined period of time.

8. The wireless communication system according to claim 7, wherein when the ON operation of the switch in the first mode is performed, the transmitter also changes the frequency band after a lapse of the corresponding predetermined period of time, and transmits the wireless signal in the frequency band selected.

9. The wireless communication system according to claim 1, wherein the transmitter is part of a mobile device that constitutes a remote keyless entry system of a vehicle, and the receiver is part of an in-vehicle device that constitutes the remote keyless entry system of the vehicle.

10. A transmitting method for a wireless communication system, comprising:

each time an ON operation of a manually operable switch is performed in a predetermined first mode, transmitting a wireless signal corresponding to the ON operation in the first mode by changing a frequency band among a plurality of predetermined frequency bands;

when an ON operation of the switch in a second mode that is different from the first mode is performed, transmitting a wireless signal, corresponding to the ON operation in the second mode, in one of the frequency bands, selected at that time;

when the ON operation of the switch in the second mode is repeatedly performed, selecting one of the plurality of predetermined frequency bands through a computation for changing a communication environment; and receiving the transmitted wireless signal and recognizing command information allocated in advance in correspondence with each of the ON operations of the switch in the respective modes.

* * * * *